US012390766B2

United States Patent
Webley et al.

(10) Patent No.: US 12,390,766 B2
(45) Date of Patent: Aug. 19, 2025

(54) STACKABLE FORWARD OSMOSIS MEMBRANE VESSEL WITH SIDE PORTS

(71) Applicant: Trevi Systems Inc., Rohnert Park, CA (US)

(72) Inventors: John Webley, Petaluma, CA (US); Sergui Charamko, Petaluma, CA (US)

(73) Assignee: Trevi Systems Inc., Rohnert Park, CA (US)

( * ) Notice: Subject to any disclaimer, the term of this patent is extended or adjusted under 35 U.S.C. 154(b) by 725 days.

(21) Appl. No.: 17/634,209

(22) PCT Filed: Aug. 7, 2020

(86) PCT No.: PCT/US2020/045457
§ 371 (c)(1),
(2) Date: Feb. 9, 2022

(87) PCT Pub. No.: WO2021/030205
PCT Pub. Date: Feb. 18, 2021

(65) Prior Publication Data
US 2022/0288533 A1 Sep. 15, 2022

Related U.S. Application Data

(60) Provisional application No. 62/885,100, filed on Aug. 9, 2019.

(51) Int. Cl.
*B01D 61/00* (2006.01)
*C02F 1/44* (2023.01)
(Continued)

(52) U.S. Cl.
CPC .......... *B01D 61/002* (2013.01); *C02F 1/445* (2013.01); *B01D 2313/44* (2013.01);
(Continued)

(58) Field of Classification Search
CPC .... C02F 1/445; C02F 9/00; C02F 1/44; C02F 1/444; C02F 1/441; C02F 1/78;
(Continued)

(56) References Cited

U.S. PATENT DOCUMENTS 8,632,681 B2  1/2014 Rasmussen
9,636,635 B2  5/2017 Benton et al.
(Continued)

FOREIGN PATENT DOCUMENTS

EP          3 501 627 A1   6/2019
KR    10-2018-0052729 A   5/2018
(Continued)

OTHER PUBLICATIONS

EP extended Search report, dated Jul. 12, 2023; Application # 20851896.9.
(Continued)

*Primary Examiner* — Allison G Fitzsimmons
(74) *Attorney, Agent, or Firm* — Polsinelli PC

(57) ABSTRACT

Forward osmosis membrane vessels, and particularly stackable forward osmosis membrane vessels, are provided as well as systems and methods thereof. The forward osmosis membrane vessel has a body, a strong draw solution chamber, a first and a second semipermeable membrane, and a brine chamber. The first and second semipermeable membranes each are disposed within the cavity of the body. The first and second semipermeable membranes are configured to produce diluted draw solution streams and brine streams. The brine chamber is disposed at least partially between the first semipermeable membrane and the second semipermeable membrane. The forward osmosis membrane vessel may be configured such that in a stacked configuration the brine chamber and the strong draw solution chamber of the forward osmosis membrane vessel aligns with a brine cham-
(Continued)

ber and a strong draw solution chamber of an adjacent second forward osmosis membrane vessel.

20 Claims, 14 Drawing Sheets

(51) Int. Cl.
  *C02F 1/00* (2023.01)
  *C02F 103/08* (2006.01)
(52) U.S. Cl.
  CPC .... *B01D 2313/54* (2013.01); *B01D 2317/022* (2013.01); *B01D 2317/04* (2013.01); *B01D 2317/06* (2013.01); *C02F 2103/08* (2013.01)
(58) Field of Classification Search
  CPC .......... C02F 1/32; C02F 1/4693; C02F 1/008; C02F 1/283; C02F 1/469; C02F 1/4691; C02F 1/4695; C02F 1/20; C02F 1/42; C02F 1/048; C02F 1/04; C02F 1/66; C02F 1/18; C02F 1/28; C02F 1/004; C02F 1/36; C02F 1/463; C02F 1/52; C02F 1/02; C02F 1/041; C02F 1/281; C02F 1/76; C02F 1/481; C02F 1/24; C02F 1/461; C02F 1/4698; C02F 1/482; C02F 1/484; C02F 1/16; C02F 1/265; C02F 1/4602; C02F 1/46114; C02F 1/4618; C02F 1/4674; C02F 1/4696; C02F 1/50; C02F 1/74; C02F 1/043; C02F 1/448; C02F 1/5236; C02F 1/68; C02F 1/763; C02F 1/002; C02F 1/042; C02F 1/14; C02F 1/22; C02F 1/385; C02F 1/46; C02F 1/688; C02F 1/00; C02F 1/006; C02F 1/06; C02F 1/288; C02F 1/40; C02F 1/467; C02F 1/4678; C02F 1/487; C02F 1/488; C02F 1/56; C02F 1/62; C02F 1/686; C02F 1/72; C02F 1/725; C02F 2209/40; C02F 2209/005; C02F 2209/03; C02F 2209/02; C02F 2209/05; C02F 2209/42; C02F 2209/04; C02F 2209/001; C02F 2209/006; C02F 2209/008; B01D 2319/04; B01D 61/002; B01D 63/12; B01D 61/58; B01D 2317/02; B01D 2319/02; B01D 61/08; B01D 2319/00; B01D 69/04; B01D 2313/10
  See application file for complete search history.

(56) References Cited

U.S. PATENT DOCUMENTS

| 2006/0144789 | A1* | 7/2006 | Cath ...................... B01D 61/58 |
| | | | 210/259 |
| 2013/0134093 | A1 | 5/2013 | Herron et al. |
| 2014/0263025 | A1 | 9/2014 | Maxwell et al. |
| 2015/0014232 | A1 | 1/2015 | McGinnis et al. |
| 2015/0014248 | A1* | 1/2015 | Herron ...................... C02F 1/44 |
| | | | 210/252 |
| 2018/0155218 | A1 | 6/2018 | Hancock et al. |
| 2019/0185350 | A1 | 6/2019 | Drover et al. |

FOREIGN PATENT DOCUMENTS

| WO | 2013/125506 A1 | 8/2013 |
| WO | 2019/021701 A1 | 1/2019 |

OTHER PUBLICATIONS

Ali, Hm et al., Pilot-Scale Investigation of Forward/Reverse Osmosis Hybrid System for Seawater Desalination Using Impaired Water from Steel Industry, International Journal of Chemical Engineering, DOI: 1.1155/2016/8745943.01, Jan. 2016, p. 2, coulumn 2, figure 1 and second paragraph, p. 4, figure 4, p. 6, col. 1, fourth paragraph.
International Preliminary Report on Patentability for International Application No. PCT/US2020/045457, mailed Feb. 17, 2022, 14 pages.
International Search Report and Written Opinion for International Application No. PCT/US2020/045457, mailed Nov. 2, 2020, 16 pages.

* cited by examiner

STACKABLE FORWARD OSMOSIS MEMBRANE VESSEL WITH SIDE PORTS

STATEMENT REGARDING GOVERNMENT SUPPORT

This invention was made with government support under DE-EE0008403 awarded by the U.S. Department of Energy (DOE) EERE (Office of Energy Efficiency and Renewable Energy). The DOE has certain rights in the invention.

CROSS-REFERENCE TO RELATED APPLICATIONS

This application is a U.S. National Phase Application of PCT/US2020/045457, filed Aug. 7, 2020, which claims the benefit of priority to U.S. Provisional Application Ser. No. 62/885,100, filed Aug. 9, 2019, the entire contents of which are each hereby incorporated by reference, for all purposes, in their entirety.

FIELD OF TECHNOLOGY

The present disclosure relates to forward osmosis membrane vessels and, particularly to stackable forward osmosis membrane vessels, for efficient and easy assembly of two or more forward osmosis membrane vessels. Additional aspects of the disclosure relate to methods and systems using such forward osmosis membrane vessels.

BACKGROUND

Fluid purification and treatment is widely used in industrial applications. Fluids suitable for fluid purification may include solutions having both dissolved solids (solutes) and liquid components (solvents), and sometimes containing suspended solid particles. A fluid may be an inorganic, organic, ionic, and/or polymeric solution, or a mixture of the above. Often the solute in a solvent is sought after for its industrial and consumer value, but in many cases the solvent is the product of use. With industry and society becoming more conscious of conservation and environmental issues, the separation, concentration, and recovery of both solute and solvent in a cost and energy efficient way is an important field of endeavor.

Forward osmosis has been used for separation and/or recovery of a solute and/or solvent from a solution. Forward osmosis uses semipermeable membranes that typically allow solvent molecules, but not solute molecules, to pass through the semipermeable membrane from the feed side to the draw side of the semipermeable membrane. To draw the solvent molecules through the semipermeable membrane, a draw solution having an osmotic pressure greater than that of the feed solution is provided to the draw side of the membrane. Forward osmosis process relies upon the natural phenomenon of diffusion of a solvent where there is a concentration gradient. The diffusion flux is sometimes approximated using Fick's Law of diffusion. The transport of the solvent from the low osmotic pressure feed side of the membrane to the high osmotic pressure draw side of the membrane generally continues until equilibrium in osmotic pressure is reached.

Forward osmosis has drawn interest due to the likelihood of future water shortage and a corresponding increase in demand for cost effective fluid purification technologies. Sea water, brackish water or otherwise contaminated water may be purified by causing water (solvent) to be transported through a semipermeable membrane that rejects the dissolved salts and other contaminates (the solutes) by using the osmotic pressure of the draw solution to pull the solvent through the membrane.

SUMMARY

Aspects of the present disclosure are directed to forward osmosis membrane vessels and, particularly to stackable forward osmosis membrane vessels. Additional aspects of the disclosure relate to methods and systems using forward osmosis membrane vessels and forward osmosis membrane vessel stacks.

In accordance with one aspect of the disclosure provided is a forward osmosis membrane vessel having a body, a strong draw solution chamber, a first and a second semipermeable membrane and a brine chamber. The body has a proximal end portion and a distal end portion spaced from the proximal end portion. The body defines a cavity therein and delineates a draw solution inlet, a diluted draw solution outlet, a first feed stream inlet, a second feed stream inlet, and a brine outlet. The strong draw solution chamber is disposed within the cavity. The strong draw solution chamber is in fluid communication with the strong draw solution inlet for receiving a strong draw solution stream. The first and second semipermeable membranes each are disposed within the cavity of the body. The first and the second semipermeable membranes each comprise a feed side for receiving a feed stream comprising a feed solute, and a draw side for receiving the strong draw solution stream comprising a draw solute. The first and second semipermeable membranes are configured to produce a diluted draw solution stream. Additionally, the first semipermeable membrane is configured to produce a first brine stream and the second semipermeable membrane is configured to produce a second brine stream. The brine chamber is disposed at least partially between the first semipermeable membrane and the second semipermeable membrane. The brine chamber is in fluid communication with the first semipermeable membrane for receiving the first brine stream and in fluid communication with the second semipermeable membrane for receiving the second brine stream.

According to another aspect of the disclosure, a forward osmosis membrane vessel is provided having a body, a strong draw solution, and a plurality of semipermeable membranes, and a brine chamber. The body has a proximal end portion and a distal end portion spaced from the proximal end portion. The body delineates a strong draw solution inlet, a diluted draw solution outlet, a first feed stream inlet, a second feed stream inlet, and a brine outlet. The body also has an inner surface defining a cavity therein. The strong draw solution chamber is disposed within the cavity at one of the proximal end portion or the distal end portion and is in fluid communication with the strong draw solution inlet for receiving a strong draw solution stream. The plurality of semipermeable membranes are each disposed within the cavity of the body. The plurality of semipermeable membranes each have a first end, a second end spaced from the first end, and an inner surface delineating a passageway extending from the first end to the second end. Each of the plurality of semipermeable membranes has a draw side along the inner surface of semipermeable membrane for receiving the strong draw solution stream comprising a draw solute and a feed side at the first base end for receiving a feed stream comprising a feed solute. The plurality of semipermeable membranes are configured to permit water and the draw solute to transfer therethrough, such that the draw solute has a cross flow direction with respect to the feed stream and each of the plurality of semipermeable membranes produces a brine stream. Further, the plurality of semipermeable membranes are configured to operate in parallel. The brine chamber is configured for receiving the brine stream produced by each of the plurality of semipermeable membranes and is in fluid communication with the brine outlet.

In accordance with a further aspect of the disclosure, provided is a forward osmosis membrane vessel configured for stacking. The forward osmosis membrane vessel includes a body having a having a proximal end portion and a distal end portion spaced from the proximal end portion. The body defines a cavity therein and delineates a strong draw solution inlet, a strong draw solution outlet, a diluted draw solution inlet, a diluted draw solution outlet, a first feed stream inlet, a second feed stream inlet, a brine inlet, and a brine outlet. Additionally, the forward osmosis membrane vessel includes a strong draw solution chamber disposed within the cavity at one of the proximal end portion or the distal end portion. The strong draw solution chamber is in fluid communication with the strong draw solution inlet for receiving a strong draw solution stream. A first and a second semipermeable membrane are also each disposed within the cavity of the body and configured for forward osmosis filtration. The forward osmosis membrane vessel has a brine chamber in fluid communication with the first semipermeable membrane for receiving a first brine stream and in fluid communication with the second semipermeable membrane for receiving a second brine stream. The forward osmosis membrane vessel is configured to be stackable, such that in a stacked configuration the brine chamber and the strong draw solution chamber of the forward osmosis membrane vessel aligns with a brine chamber and a strong draw solution chamber of an adjacent second forward osmosis membrane vessel.

BRIEF DESCRIPTION OF THE DRAWINGS

The advantages and features of the disclosure will become apparent by reference to specific embodiments thereof, which are illustrated in the appended drawings, with like elements having the same reference numerals. When a plurality of similar elements is present, a single reference numeral may be assigned to the plurality of similar elements with a small letter designation referring to specific elements. When referring to the elements collectively or to a non-specific one or more of the elements, the small letter designation may be dropped. In accordance with common practice, the various features of the drawings are not drawn to scale unless otherwise indicated. On the contrary, the dimensions of the various features may be expanded or reduced for clarity. These drawings are example embodiments of the disclosure and are, therefore, not to be considered to be limiting of its scope. Included in the drawings are the following figures.

DETAILED DESCRIPTION

Figure 1:
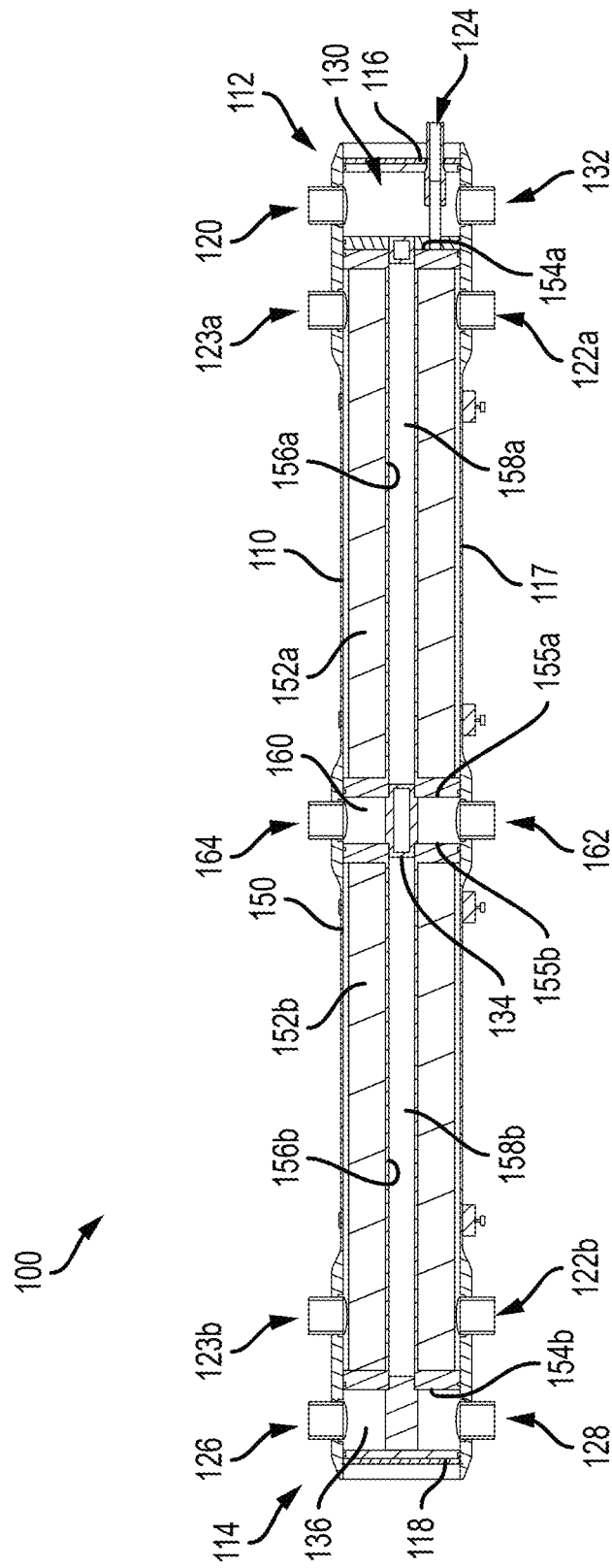
FIG. 1 depicts a cross-sectional view of a stackable forward osmosis membrane vessel having a single end inlet through the base end in accordance with an aspect of the disclosure.

Aspects of the present disclosure relate to forward osmosis membrane vessels and, particularly to stackable forward osmosis membrane vessels. The forward osmosis membrane vessels disclosed herein provide energy efficient separation of a feed stream into, e.g., a water-rich stream and a feed solute-rich stream (hereinafter "brine stream"). Additionally, the forward osmosis membrane vessels may be configured to be stackable to enable easy assembly of a forward osmosis membrane vessel stack. Additional aspects of the disclosure relate to systems and methods for using forward osmosis membrane vessels and forward osmosis membrane vessel stacks.

As used herein, the term "stream," in its various forms, including its use in the term "feed stream," refers to a solution that may be flowed to or received in a portion or component of an apparatus or system of the present disclosure, and is not limited to solutions introduced into an apparatus or system, or portion thereof, under continuous flow, but rather, may also include solutions received in an apparatus or system for a period of time, such as that which may be employed in a series of batch processes. The feed stream may be an aqueous or non-aqueous stream containing salts, ions, acids, bases, metals, fertilizers, carbohydrates, proteins, sugars, monomers, polymers, biomaterials, or other pollutants typically treated with forward osmosis systems, such as brackish water, sea water, saline water, polluted water, farm runoff, chemical/manufacturing plant waste, etc. The feed solutes or particles thereof in the feed stream may be a desired product. For example, the feed stream may contain a dairy composition and the feed solute or particles thereof may be desirable for producing a diary concentrate. The feed stream (e.g. feed stream 142) may, in some instances, be an aqueous solution containing sodium chloride (NaCl), potassium chloride (KCl), magnesium chloride ($MgCl_2$), magnesium carbonate ($MgCO_3$), magnesium sulfate ($MgSO_4$), calcium chloride ($CaCl_2$), calcium sulfate ($CaSO_4$), calcium carbonate ($CaCO_3$), potassium acetate (KAc) calcium magnesium acetate (CaMgAc), transition metals, lanthanides, and actinides, cyanides, nitrates, nitrites, sulfates, sulfites, sulfonates, hydroxides, phosphates, phosphites, halides, acetates, arsenides, amines, carboxylates, nitros and/or sugars. In some instances, the feed steam may have biological particulate or organisms, such as algae, plant matter, animal matter, or the like.

The strong draw solution stream (e.g., strong draw solution stream 140) may be an aqueous or non-aqueous stream containing an amount of solute to achieve a desirable osmotic pressure for the strong draw solution stream. In some instances, the strong draw solution stream includes a draw solute or draw solute particles that have a change in solubility based on a change in one or more process conditions, such as temperature, pressure, and/or pH change, and/or the introduction of additives, such as gasses and/or liquids that change the solubility of the draw solute or draw solute particles. For example, the strong draw solution stream may include draw solute or draw solute particles that are less soluble in an aqueous solution as the temperature rises, such that phase separation may be induced in the diluted draw solution stream (e.g., diluted draw solution stream 142) by increasing the temperature of the diluted draw solution stream to produce a phase rich in water and a phase rich in draw solute or draw solute particles. Suitable draw solutes and/or draw particles include random or sequential copolymer of low molecular weight diols such as 1,2 propanediol, 1,3 propanediol and/or 1,2 ethanediol. In at least some instances, the draw solutes and/or draw particles may be a thermally sensitive oligomers or polymers, which can be heated with waste heat to separate the draw solutes and/or draw particles from the solvent component, thus enabling the reuse of the draw solutes and/or draw particles. The draw solutes and/or draw particles may also be a natural compound, a "green material," and/or a compound produced by green chemistry for health and safety considerations intrinsic to water purification applications. Additional draw solutes and/or draw particles that may be suitable for the strong draw solution stream and the diluted draw solution stream can be found in US Patent Publication Nos.: US 20160039685 and US 20190054421, which are incorporated herein in their entirety for all purposes.

FIG. 1 depicts a first non-limiting, exemplary embodiment of a forward osmosis membrane vessel 100 in accordance with aspects of the disclosure. As a brief overview, forward osmosis membrane vessel 100 includes a body 110 defining a cavity 150 and at least two semipermeable membranes 152 disposed within cavity 150.

Body 110 of forward osmosis membrane vessel 100 has a proximal end portion 112 and a distal end portion 114 spaced from proximal end portion 112. Body 110 may form a cylindrical shape having a first base end 116, a second base end 118, and a side wall 117 extending between first base end 116 and second base end 118. Although body 110 of forward osmosis membrane vessel 100 is illustrated in FIGS. 1-6B as forming a cylindrical shape, in other embodiments, the body of the forward osmosis membrane vessel may be rectangular, square, pentagonal, hexagonal, octagonal, decagonal, or another geometric or non-geometric shape. In at least one embodiment, body 110 has a circumferential side wall 117.

Body 110 is configured to include a plurality of inlets and outlets, which may be formed by one or more apertures. Body 110 defines at least a strong draw solution inlet 120, a diluted draw solution outlet 122, a first feed stream inlet 124, a second feed stream inlet 126, and a brine stream outlet 162 that may each be formed by a separate aperture extending from body 110. As illustrated by the embodiment shown in FIG. 1, strong draw solution inlet 120, diluted draw solution outlet 122, first feed stream inlet 124, second feed stream inlet 126, and/or brine stream outlet 162 may extend through side wall 117 or one of base ends 116 or 118. Preferably, strong draw solution inlet 120, diluted draw solution outlet 122, and brine stream outlet 162 extend through side wall 117. Although forward osmosis membrane vessel 100 is illustrated as having first feed stream inlet 124 formed by an aperture extending through first base end 116 and second feed stream inlet 126 formed by an aperture extending through side wall 117, in other embodiments the first feed stream inlet extends through the side wall of the body while the second feed stream inlet extends through a base end. In yet further embodiments, first feed stream inlet 124 and second feed stream inlet 126 extend through base ends 116 and 118.

Body 110 may also include a strong draw solution outlet 132, a brine stream inlet 164, a feed stream outlet 128, and diluted draw solution inlets 123a and 123b. Preferably, sidewall 117 of body 110 defines strong draw solution outlet 132, brine stream inlet 164, feed stream outlet 128, and diluted draw solution inlets 123, or includes a plurality of apertures forming the same. In one embodiment, forward osmosis membrane vessel 100 includes a single brine stream outlet 162. Additionally or alternatively, forward osmosis membrane vessel 100 may be configured such that first base end 116 and second base end 118, together, have two or less inlets and/or outlets. In some instances, forward osmosis membrane vessel 100 includes only one inlet and/or outlet (e.g., second feed stream inlet 124) extending through one of the base ends 116 or 118.

Body 110 has an inner surface defining a cavity 150 within body 110. A strong draw solution chamber 130 is disposed within cavity 150, preferably at one of proximal end portion 112 or the distal end portion 114. Strong draw solution chamber 130 is in fluid communication with strong draw solution inlet 120 for receiving strong draw solution stream 140. Strong draw solution chamber 130 is configured to receive strong draw solution stream 140 and to provide and/or direct flow of strong draw solution stream 140 to semipermeable membranes 152. In some embodiments, strong draw solution chamber 130 is configured to be in fluid communication with strong draw solution outlet 132, such that a portion of strong draw solution stream 140 may bypass semipermeable membranes 152 to flow out of forward osmosis membrane vessel 100 without contacting feed stream 142.

Body 110 may also include a feed stream chamber 136 disposed within cavity 150. Feed stream chamber 136 is, preferably, disposed at one of proximal end portion 112 or distal end portion 114. For example, feed stream chamber 136 may be disposed within cavity 150 at distal end portion 114 while strong draw solution chamber 130 is disposed at proximal end portion 112 or feed stream chamber 136 may be disposed at proximal end portion 112 while strong draw solution chamber 130 is disposed at distal end portion 114. Feed stream chamber 136 may be in fluid communication with either the first feed stream inlet 124 or second feed stream inlet 126 and, optionally, in fluid communication with feed stream outlet 128, such that a portion of feed stream 142 may bypass semipermeable membranes 152 and flow out of forward osmosis membrane vessel 100 without contacting strong draw solution stream 140.

Forward osmosis membrane vessel 100 includes at least two semipermeable membranes 152 (e.g., first semipermeable membrane 152a and second semipermeable membrane 152b) disposed within the cavity of body 110. Although the embodiment of forward osmosis membrane vessel 100 depicted in FIG. 1 includes only two semipermeable membranes, forward osmosis membrane vessel 100 may be configured to include more than two semipermeable membranes, such as three semipermeable membranes, four semipermeable membranes, five semipermeable membranes, or at least six semipermeable membranes. The semipermeable membranes 152 include a feed side for receiving feed stream 142 comprising a feed solute and a draw side for receiving strong draw solution stream 140 comprising a draw solute. Strong draw solution stream 140 may have an osmotic pressure that is equal to or greater than the osmotic pressure of feed stream 142. In some embodiments, however, strong draw solution stream 140 has an osmotic pressure that is less than that of the feed stream 142, such that diffusion of solvent (e.g., water) from feed stream 142 through semipermeable membrane 152 is assisted with a pressure that is greater on the feed side than on the draw side. In one embodiment, the osmotic pressure of strong draw solution stream 140 is substantially equal to or equal to the osmotic pressure of feed stream 142.

Semipermeable membranes 152 are configured to produce diluted draw solution stream 144 and brine stream 146. In the embodiment illustrated by FIG. 2, first semipermeable membrane 152a produces a first diluted draw solution stream 144a and a first brine stream 146a while second semipermeable membrane 152b produces a second diluted draw solution stream 144b and a second brine stream 146b. Semipermeable membranes 152 may be configured to have a first end 154, a second end 155 spaced from the first end 154, and an inner surface 156 delineating a passageway 158 extending from first end 154 to second end 155. As illustrated in FIG. 1, passageway 158a of first semipermeable membrane 152a may form a single continuous passageway with passageway 158b of second semipermeable membrane 152b. Preferably, passageway 158a of first semipermeable membrane 152a aligns with passageway 158b of second semipermeable membrane 152b. In at least one embodiment, passageway 158a of first semipermeable membrane 152a coaxially aligns with passageway 158b of second semipermeable membrane 152b. In embodiments where strong draw solution stream 140 flows through passageway 158, inner surface 156 of semipermeable membranes 152 may operate as the draw side.

Semipermeable membranes 152 may be configured to have a shape that corresponds to the inner surface defining cavity 150 and/or to body 110. For example, semipermeable membranes 152 may each be configured to be cylindrical. A space extends between the inner surface defining cavity 150 of body 110 and an outer surface of semipermeable membranes 152. The space may be configured for receiving and/or collecting diluted draw solution stream 144. Additionally the space is in fluid communication with diluted draw solution outlet(s) 122.

Figure 2:
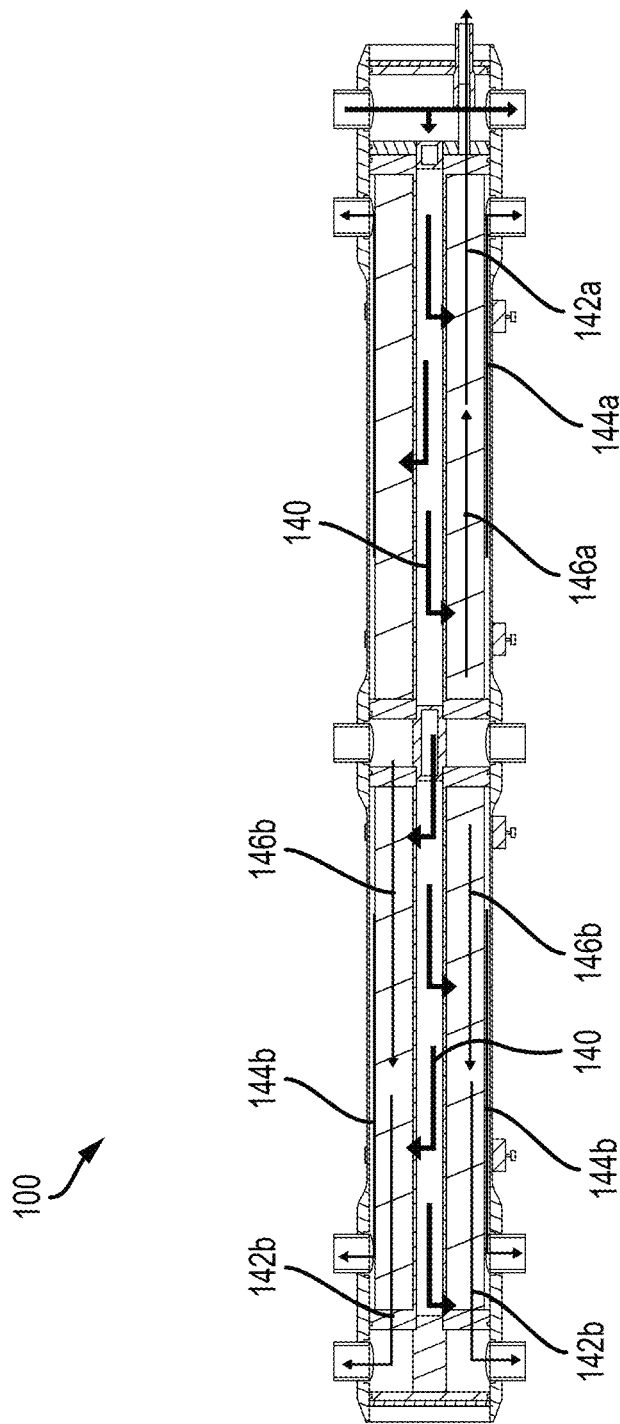
FIG. 2 depicts the cross-sectional view of the forward osmosis membrane vessel of FIG. 1 with arrows to indicate an exemplary flow path of the streams therein.

Forward osmosis membrane vessel 100 includes a brine chamber 160 in fluid communication with brine stream outlet 162 and configured for receiving brine stream 146. Brine chamber 160 receives brine streams 146 produced from each of semipermeable membranes 152 directly or indirectly. For example, as illustrated in FIGS. 1 and 2, brine chamber 160 is disposed at least partially between first semipermeable membrane 152a and second semipermeable membrane 152b to directly receive brine stream 146a produced from first semipermeable membrane 152a and second brine stream 146b produced from second semipermeable membrane 152b. In one embodiment, forward osmosis membrane vessel 100 includes solely one brine stream outlet 162. Additionally or alternatively, forward osmosis membrane vessel 100 may include a brine inlet 164 that is in fluid communication with brine chamber 160.

A central core manifold 134 is positioned within brine chamber 160. Central core manifold 134 extends from passageway 158a of first semipermeable membrane 152a to second passageway 158b of second semipermeable membrane 152b, such that strong draw solution stream 140 may flow through brine chamber 160 without mixing with brine stream 146 therein.

The semipermeable membranes 152 may be adapted for cross-flow filtration, whereby strong draw solution stream 140 flows in a radial direction from inner surface 156 to the outer surface of semipermeable membrane 152, while feed stream 140 flows in an axial direction from first end 154 to second end 155 of semipermeable membranes 152. For example, the feed solute and/or feed particles (e.g., salt, ion, metal, etc.) of feed stream 140 may pass through semipermeable membrane 152 in an axial direction, while the draw solute and/or draw solute particles of strong draw solution stream 140 pass through semipermeable membrane 152 in a radial direction.

Forward osmosis membrane vessel 100 is configured such that semipermeable membranes 152 operate in parallel. As illustrated in FIG. 2, feed stream 142 may enter forward osmosis membrane vessel 100 through first feed stream inlet 124 located at proximal end portion 112 and second feed stream inlet 126 located at distal end portion 114. Feed stream 142b flowing through second stream inlet 126 may flow to feed stream chamber 136 and subsequently second semipermeable membrane 152b. Feed stream 142a flowing through first feed stream inlet 124 flows through an aperture that extends through strong draw solution chamber 130, such that feed stream 142a flows into first semipermeable membrane 152a without mixing with strong draw solution stream 140 within strong draw solution chamber 130. Strong draw solution stream 140 may enter forward osmosis membrane vessel 100 by way of strong draw solution inlet 120 and flow into strong draw solution chamber 130 and subsequently to passageway 158 extending through semipermeable membranes 152. Central core manifold 134 is disposed within brine chamber 160 to transfer strong draw solution stream 140 flowing through passageway 158a of first semipermeable membrane 152a to second passageway 158b of second semipermeable membrane 152b. By employing central manifold 134, first and second semipermeable membranes 152a and 152b may operate in parallel and receive strong draw solution stream 140 from a continuous passageway 158 that flows through brine chamber 160, which is positioned between first semipermeable membrane 152 and second permeable membrane 152b.

Pursuant to the exemplary flow path illustrated in FIG. 2, as feed stream 142 passes through semipermeable membranes 152 in a radial direction, strong draw solution stream 140 passes through semipermeable membrane 152 in an axial direction and pulls water from feed stream 142 to form diluted draw solution stream 144 and to produce brine stream 146 from feed stream 142. Diluted draw solution stream 144a produced from semipermeable membrane 152a may pass through diluted draw solution outlet 122a, while diluted draw solution stream 144b produced from semipermeable membrane 152b may exit diluted draw solution outlet 122b. Brine stream 146a produced from semipermeable membrane 152a and brine stream 146b produce from semipermeable membrane 152b flow into a single brine chamber 160 and may flow out of forward osmosis membrane vessel 100 via brine stream outlet 162.

Forward osmosis membrane vessel 100 may be configured to be stackable, such that that a plurality of forward osmosis membrane vessels 100 may be assembled to form a forward osmosis membrane vessel stack, as further discussed below. In the stacked configuration, brine chamber 160 and strong draw solution chamber 130 of first forward osmosis membrane vessel 100 aligns with brine chamber 160 and strong draw solution chamber 130 of an adjacent second forward osmosis membrane vessel 100.

Figure 3:
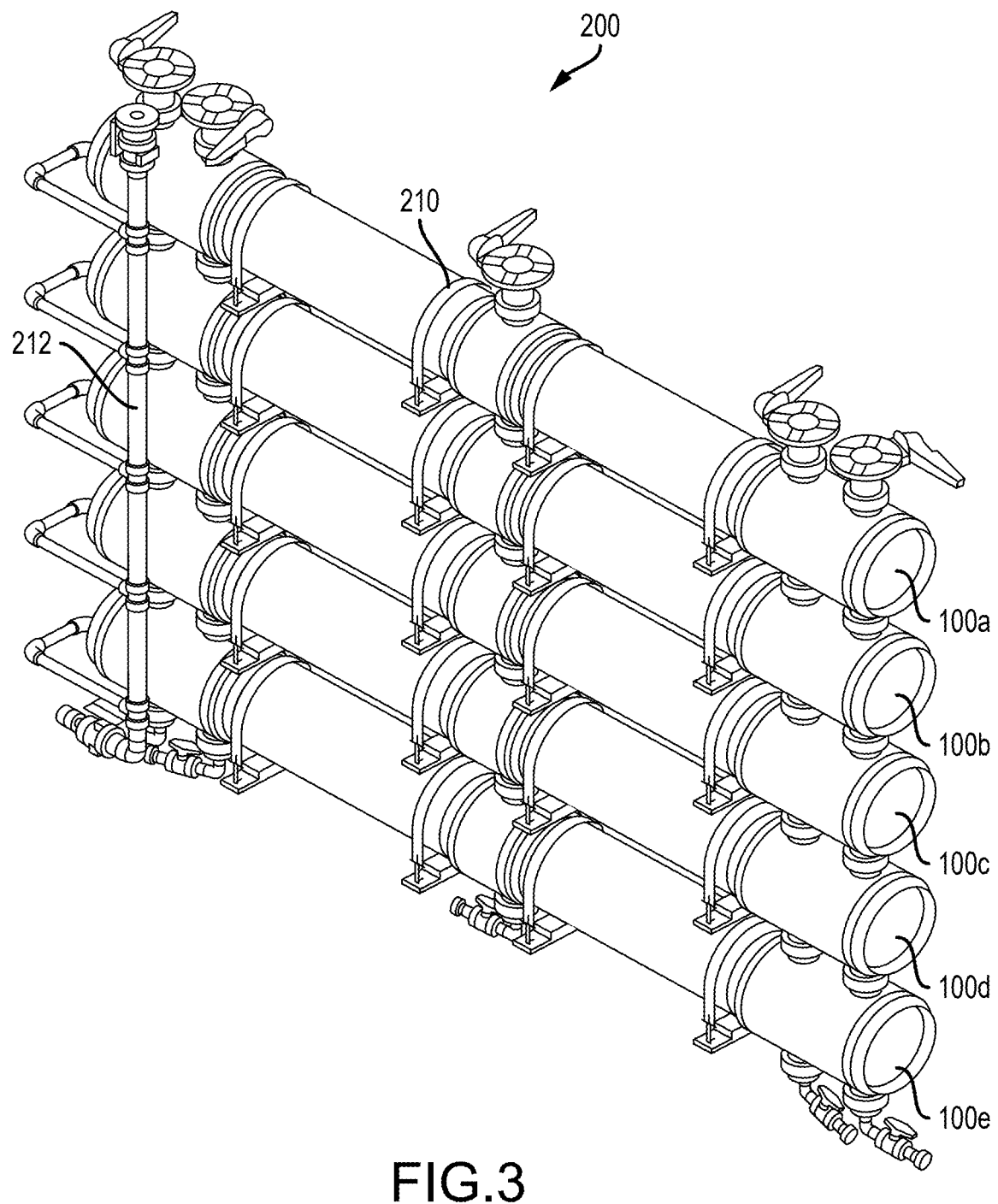
FIG. 3 is a perspective view of a forward osmosis membrane vessel stack assembled from a plurality of the forward osmosis membrane vessels of FIG. 1 according to another aspect of the disclosure.
Figure 4:
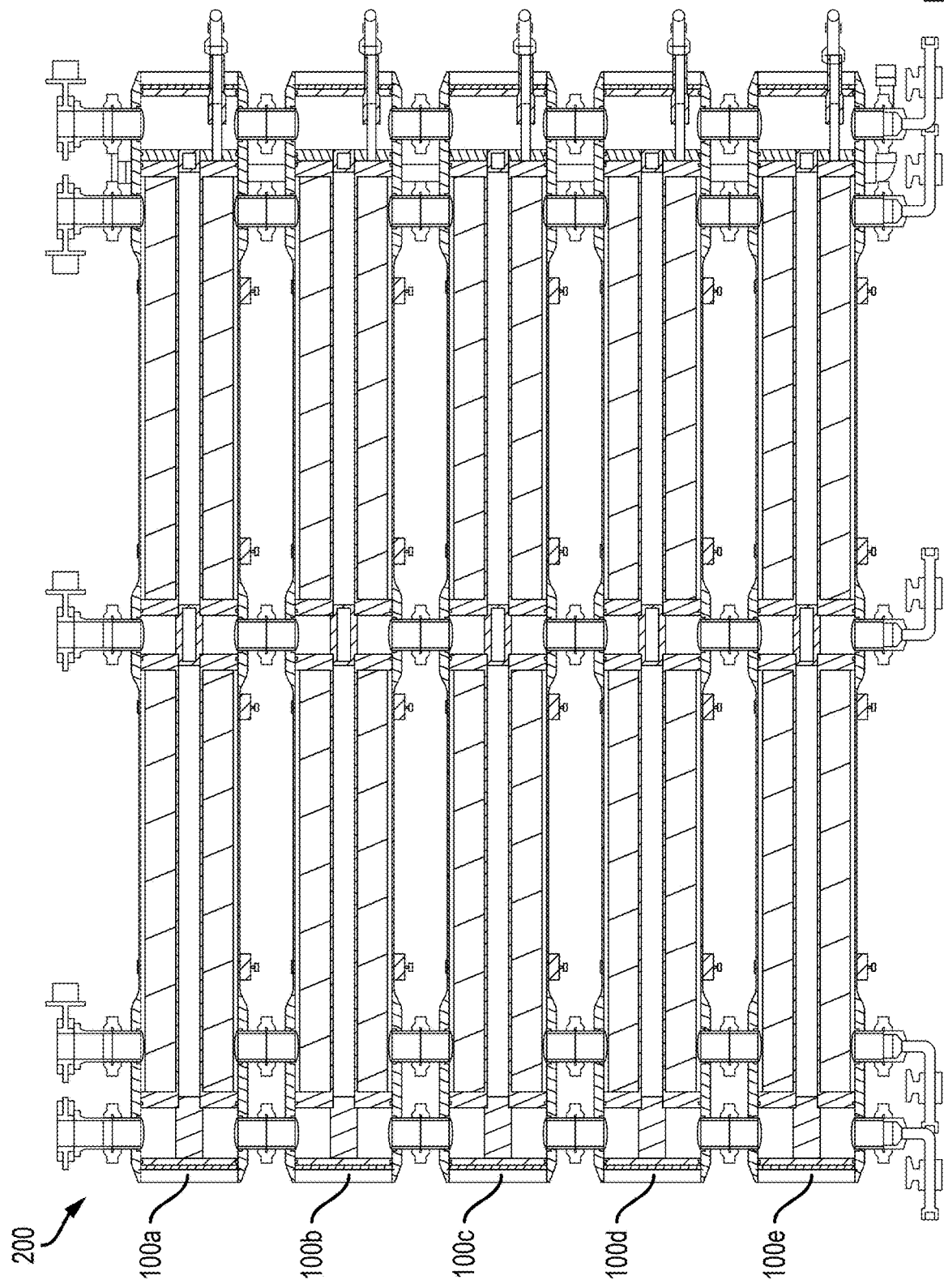
FIG. 4 depicts a cross-sectional view of the forward osmosis membrane vessel stack of FIG. 3.
Figure 5:
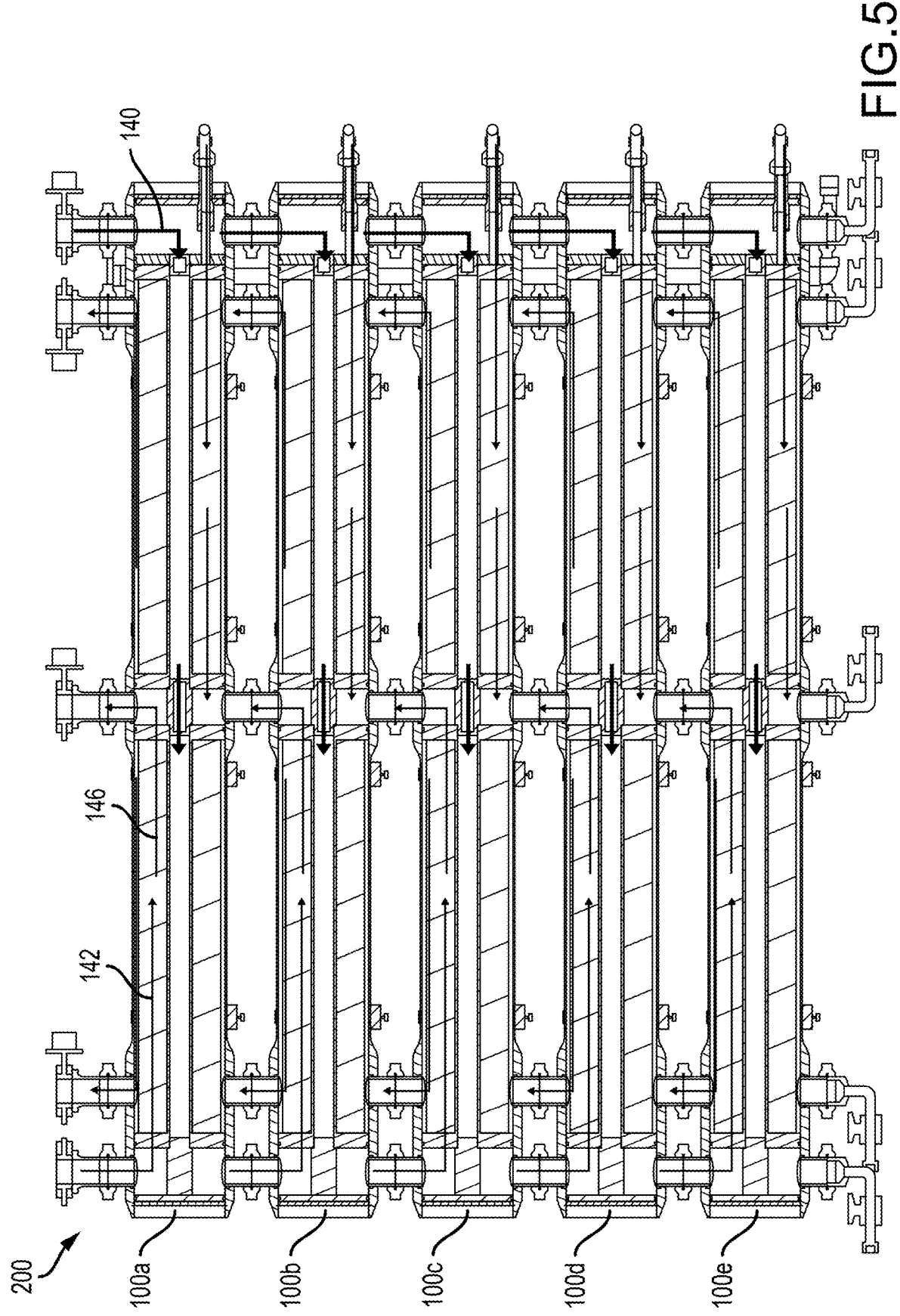
FIG. 5 depicts the cross-sectional view of the forward osmosis membrane vessel stack of FIG. 4 with arrows to indicate an exemplary flow path of the streams therein.

FIGS. 3-5 depict a forward osmosis membrane vessel stack 200 according to another aspect of the disclosure. Forward osmosis membrane vessel stack 200 includes a plurality of at least two forward osmosis membrane vessels 100 in a stacked configuration. Although FIG. 3 illustrates a plurality of five forward osmosis membrane vessels 100a-100e in a stacked configuration, forward osmosis membrane vessel stack 200 may include three, four, six, seven, eight, nine, or at least ten forward osmosis membrane vessels 100. Forward osmosis membrane vessel stack 200 may also include one or more support brackets 210 to stabilize and/or couple a first forward osmosis membrane vessels 100a to an adjacent second forward osmosis membrane vessel 100b.

As seen in FIG. 4, the plurality of forward osmosis membrane vessels 100 of forward osmosis membrane vessel stack 200 may be assembled such that brine chamber 160 and strong draw solution chamber 130 of a first forward osmosis membrane vessel 100a align with brine chamber 160 and strong draw solution chamber 130, respectively, of an adjacent second forward osmosis membrane vessel 100b. Forward osmosis membrane vessel stack 200 may also be assembled such that feed chamber 136 of first forward osmosis membrane vessel 100a aligns with feed chamber 136 of adjacent second forward osmosis membrane vessel 100b. Additionally or alternatively, one or more of strong draw solution outlet 132, brine stream outlet 162, diluted draw solution outlet 122, and feed stream outlet 128 of first forward osmosis membrane vessel 100a may align with strong draw solution inlet 120, brine stream inlet 164, diluted draw solution inlet 123, and feed stream inlet 124, respectively, of adjacent second forward osmosis membrane vessel 100b.

Forward osmosis membrane vessel stack 200 may be configured such that the plurality of forward osmosis membrane vessels 100 may be in fluid communication and/or coupled. Each of the plurality of forward osmosis membrane vessels 100 may be coupled directly (e.g., an aperture of first forward osmosis membrane vessel 100a may be attached to an aperture of adjacent second forward osmosis membrane vessel 100b) or indirectly (e.g., an outlet of first forward osmosis membrane vessel 100a may be coupled to an inlet of adjacent second forward osmosis membrane vessel 100b via tubes, pipes, etc.) to an adjacent forward osmosis membrane vessel 100.

For example, brine stream outlet 162 of first forward osmosis membrane vessel 100a may be in fluid communication with brine stream inlet 164 of adjacent second forward osmosis membrane vessel 100b. In some embodiments, brine stream outlet 162 of first forward osmosis membrane vessel 100a is connected (e.g., by attachment of adjacent apertures) to brine stream inlet 164 of adjacent second forward osmosis membrane vessel 100b. Strong draw solution outlet 132 of first forward osmosis membrane vessel 100a may be in fluid communication with strong draw solution inlet 120 of adjacent second forward osmosis membrane vessel 100b. In at least one embodiment, strong draw solution outlet 132 of first forward osmosis membrane vessel 100a is connected (e.g., by attachment of adjacent apertures) to strong draw solution inlet 120 of adjacent second forward osmosis membrane vessel 100b. Diluted draw solution outlet 122 of first osmosis vessel 100a may be in fluid communication with diluted draw solution inlets 123 of second adjacent forward osmosis membrane vessel 100b. For instance, diluted draw solution outlet 122 of first osmosis vessel 100a may be connected (e.g., by attachment of adjacent apertures) to diluted draw solution inlets 123 of second adjacent forward osmosis membrane vessel 100b. In at least one embodiment, the apertures forming strong draw solution outlet 132, brine stream outlet 162, diluted draw solution outlet 122, and feed stream outlet 128 of first forward osmosis membrane vessel 100a are be configured to directly connect (e.g., by attachment of adjacent apertures) to the strong draw solution inlet 120, brine stream inlet 164, diluted draw solution inlet 123, and feed stream inlet 124 of adjacent second forward osmosis membrane vessel 100b, respectively.

Forward osmosis membrane vessel stack 200 may be configured such that each of the plurality of forward osmosis membrane vessels 100 operate in parallel. Forward osmosis membrane vessel stack 200 may include a single distribution pipe 212 for distributing feed stream 142a to first feed stream inlet 124 of each of the plurality of forward osmosis membrane vessels 100. Additionally, forward osmosis membrane vessel stack 200 may be configured such that providing a single one of the plurality of forward osmosis membrane vessels 100 with a strong draw stream 140 provides each of the plurality of forward osmosis membrane vessels 100 with strong draw stream 140 and enables the plurality of forward osmosis membrane vessels 100, and semipermeable membranes 152 therein, to operate in parallel. Diluted draw solution stream 144 and brine stream 146 produced from all of the plurality of forward osmosis membrane vessels 100 may be removed and/or collected from outlets (e.g., diluted draw solution outlet 122 and/or brine outlet 162) of a single forward osmosis membrane vessel 100e.

Figure 6B:
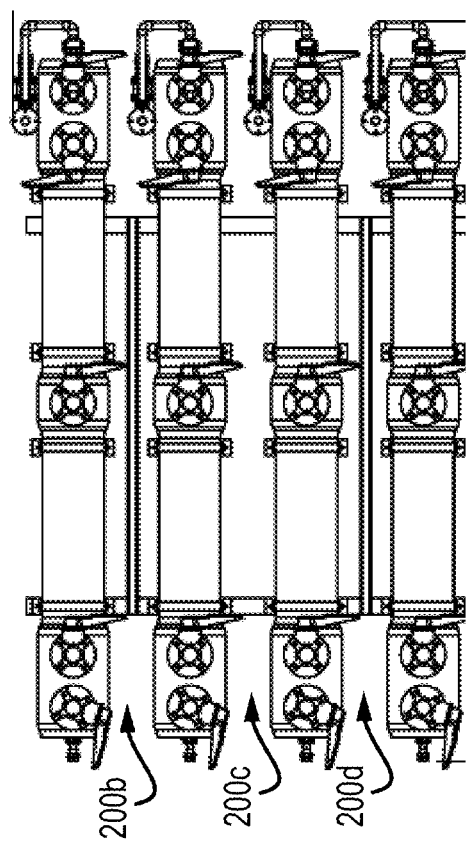
FIG. 6B is a top view of the plurality of the forward osmosis membrane vessel stacks of FIG. 6A.
Figure 6A:
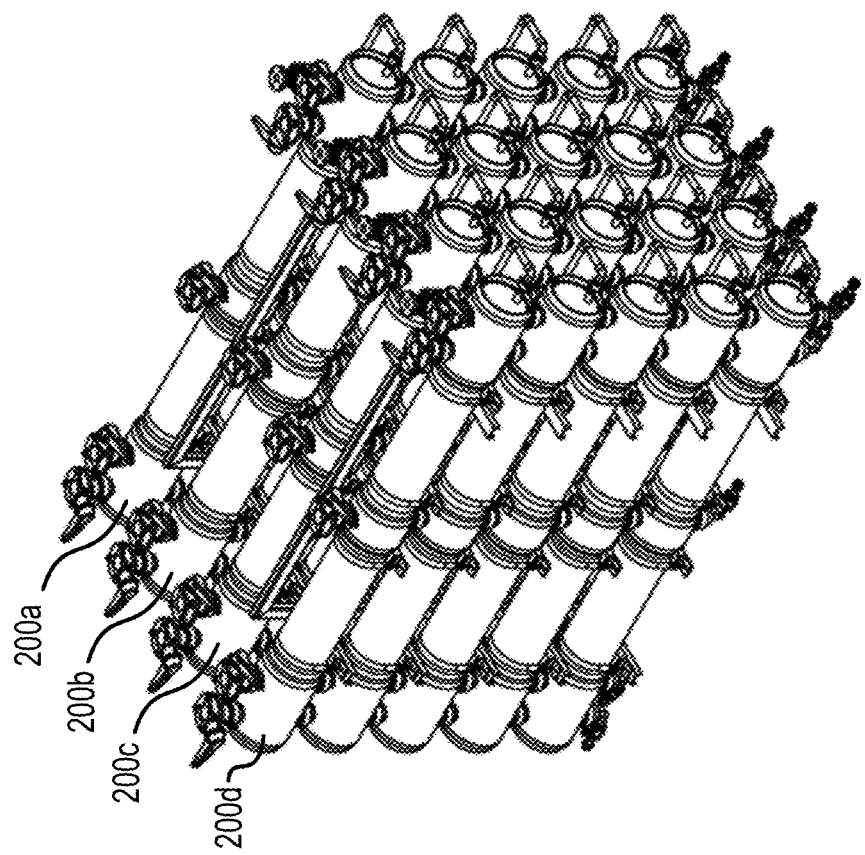
FIG. 6A is a perspective view of a plurality of the forward osmosis membrane vessel stacks of FIG. 3 coupled together.

FIGS. 6A and 6B depict a plurality of forward osmosis membrane vessel stacks 200 coupled together. Although the embodiments illustrated in FIGS. 6A and 6B include four forward osmosis membrane vessel stacks 200, more than four or less than four forward osmosis membrane vessel stacks 200 may be included. One of ordinary skill in the art would understand how to affix two or more forward osmosis membrane vessel stacks 200 adjacent to each other, e.g., using one or more straps, saddles, support frames, and hardware. For example, a support frame 214 may be used for securing the forward osmosis membrane vessel stacks 200 in a relative position with respect to each other.

Figure 7:
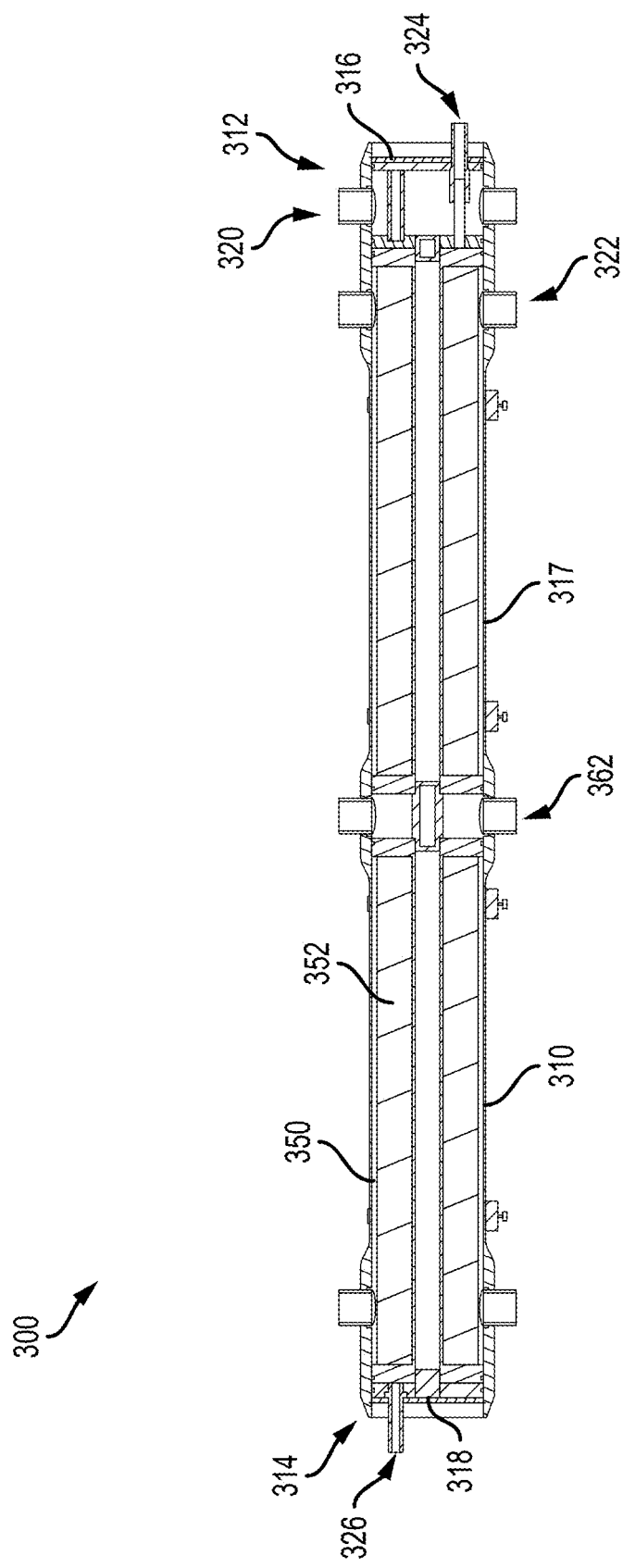
FIG. 7 depicts a cross-sectional view of another stackable forward osmosis membrane vessel having two inlets through the base ends in accordance with a further aspect of the disclosure.

FIG. 7 depicts another exemplary, non-limiting embodiment of a forward osmosis membrane vessel 300 in accordance with aspects of the disclosure. Forward osmosis membrane vessel 300 operates similar to forward osmosis membrane vessel 100 and includes similar features and/or elements, which may be omitted for brevity from the description below. It should be understood that although similar features and/or elements may be employed, various aspects of forward osmosis membrane vessel 300, e.g., size, shape, material, etc., may be different than those described with respect to forward osmosis membrane vessel 100.

As a brief overview, forward osmosis membrane vessel 300 includes a body 310 defining a cavity 350 and at least two semipermeable membranes 352 disposed within cavity 350. Unlike forward osmosis membrane vessel 100, forward osmosis membrane vessel 300 includes a first feed stream inlet 324 and a second feed stream inlet 326 that extend through end bases 316 and 318 of body 310.

Figure 8:
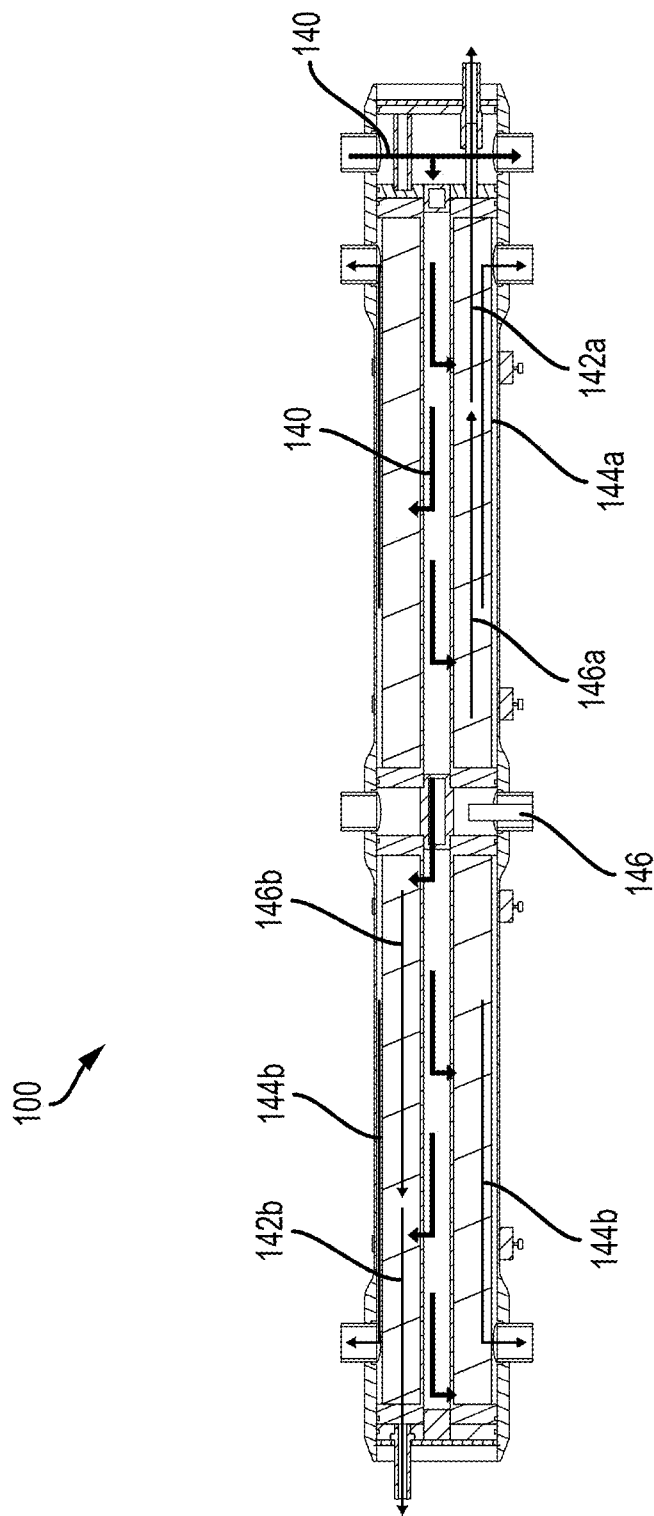
FIG. 8 depicts the cross-sectional view of the forward osmosis membrane vessel of FIG. 7 with arrows to indicate an exemplary flow path of the streams therein.

Body 310 has a proximal end portion 312 and a distal end portion 314 spaced from proximal end portion 312. Body 310 may form a cylindrical shape having a first base end 316, a second base end 318, and a side wall 317 extending between first base end 316 and second base end 318. Body 310 is configured to include a plurality of inlets and outlets, which may be formed by one or more apertures. Body 310 defines at least a strong draw solution inlet 320, a diluted draw solution outlet 322, a first feed stream inlet 324, a second feed stream inlet 326, and a brine stream outlet 362 each formed by a separate aperture extending through body 310. As illustrated by the embodiment shown in FIG. 7, strong draw solution inlet 320, diluted draw solution outlet 322, and brine stream outlet 362 extend through side wall 317, while first feed stream inlet 324 and second feed stream inlet 326 extend through base ends 316 and 318, respectively. As depicted by FIGS. 7 and 8, forward osmosis membrane vessel 300 does not include a feed stream chamber or a feed stream outlet.

Figure 9:
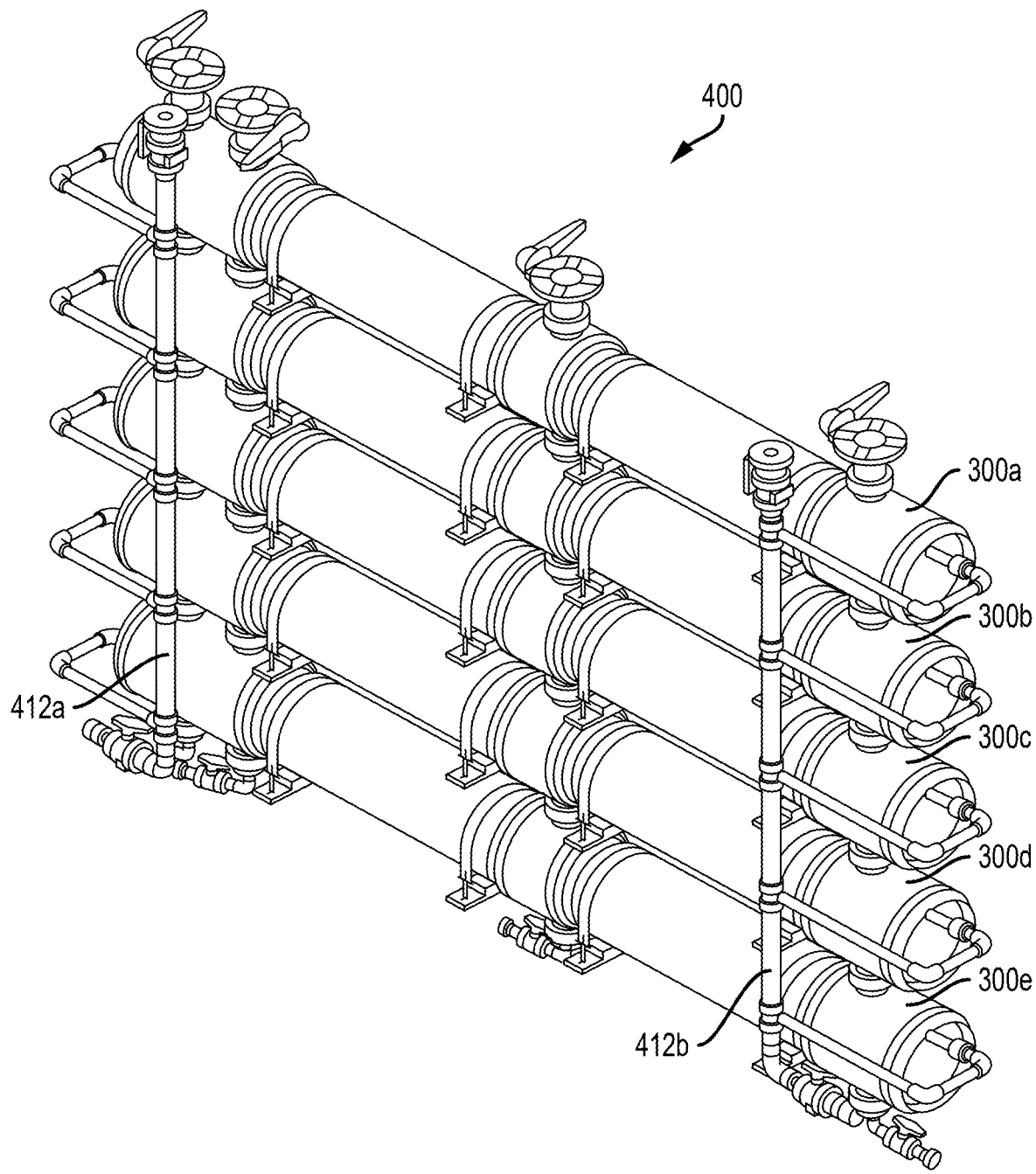
FIG. 9 is a perspective view of a forward osmosis membrane vessel stack assembled from a plurality of the forward osmosis membrane vessels of FIG. 7 according to an additional aspect of the disclosure.

FIG. 9 depicts a forward osmosis membrane vessel stack 400 according to another aspect of the disclosure. Forward osmosis membrane vessel stack 400 is similar to forward osmosis membrane vessel stack 200, but includes a plurality of at least two forward osmosis membrane vessels 300 in a stacked configuration. Although FIG. 9 illustrates a plurality of five forward osmosis membrane vessels 300a-300e in a stacked configuration, forward osmosis membrane vessel stack 400 may include three, four, six, seven, eight, nine, or at least ten forward osmosis membrane vessels 300 in a stacked configuration. Forward osmosis membrane vessel stack 400 includes two distribution pipes 412a and 412b for distributing a feed stream to first and second feed stream inlets 324 and 326 of each of the plurality of forward osmosis membrane vessels 300.

Figure 10B:
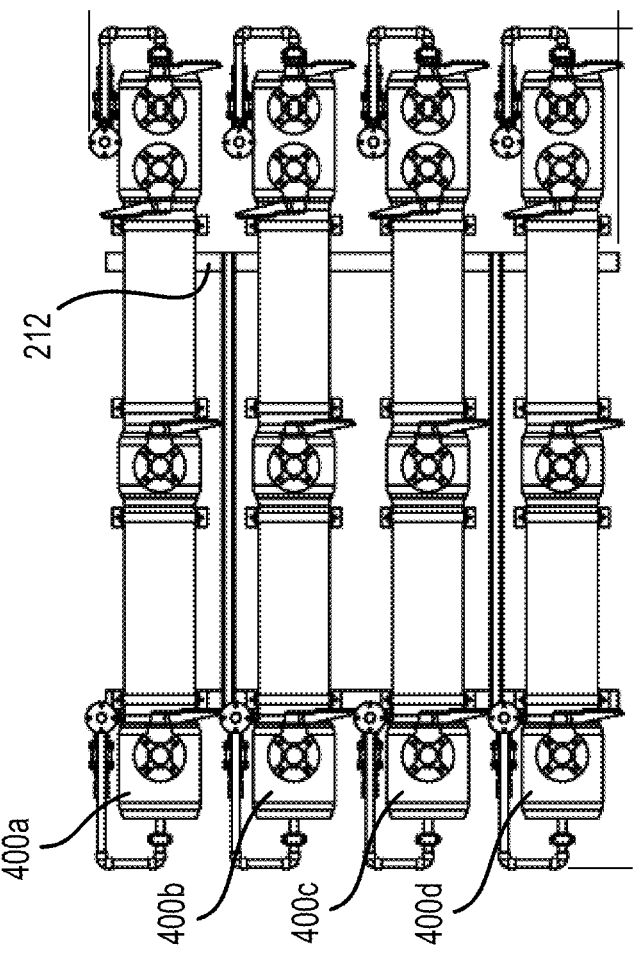
FIG. 10B is a top view of the plurality of the forward osmosis membrane vessel stacks of FIG. 10A.
Figure 10A:
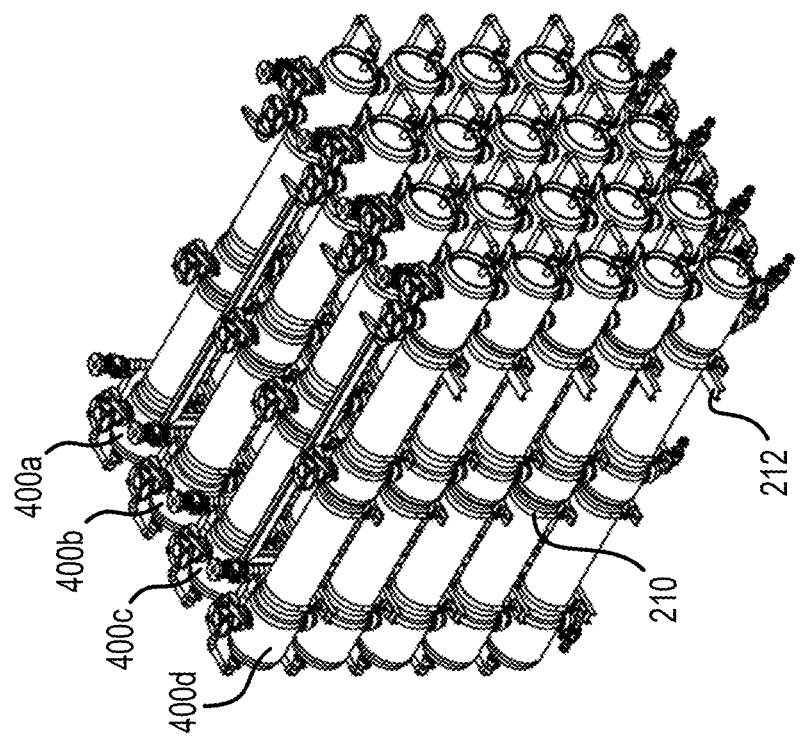
FIG. 10A is a perspective view of a plurality of the forward osmosis membrane vessel stacks of FIG. 9 coupled together.

FIGS. 10A and 10B depict a plurality of forward osmosis membrane vessel stacks 400 coupled together. Although the embodiments illustrated in FIGS. 10A and 10B include four forward osmosis membrane vessel stacks 400, more than four or less than four forward osmosis membrane vessel stacks 400 may be included. One of ordinary skill in the art would understand how to affix two or more forward osmosis membrane vessel stacks 400 adjacent to each other, e.g., using one or more straps, saddles, support frames, and hardware. For example, a support frame 214 may be used for securing the forward osmosis membrane vessel stacks 400 in a relative position with respect to each other.

Figure 11:
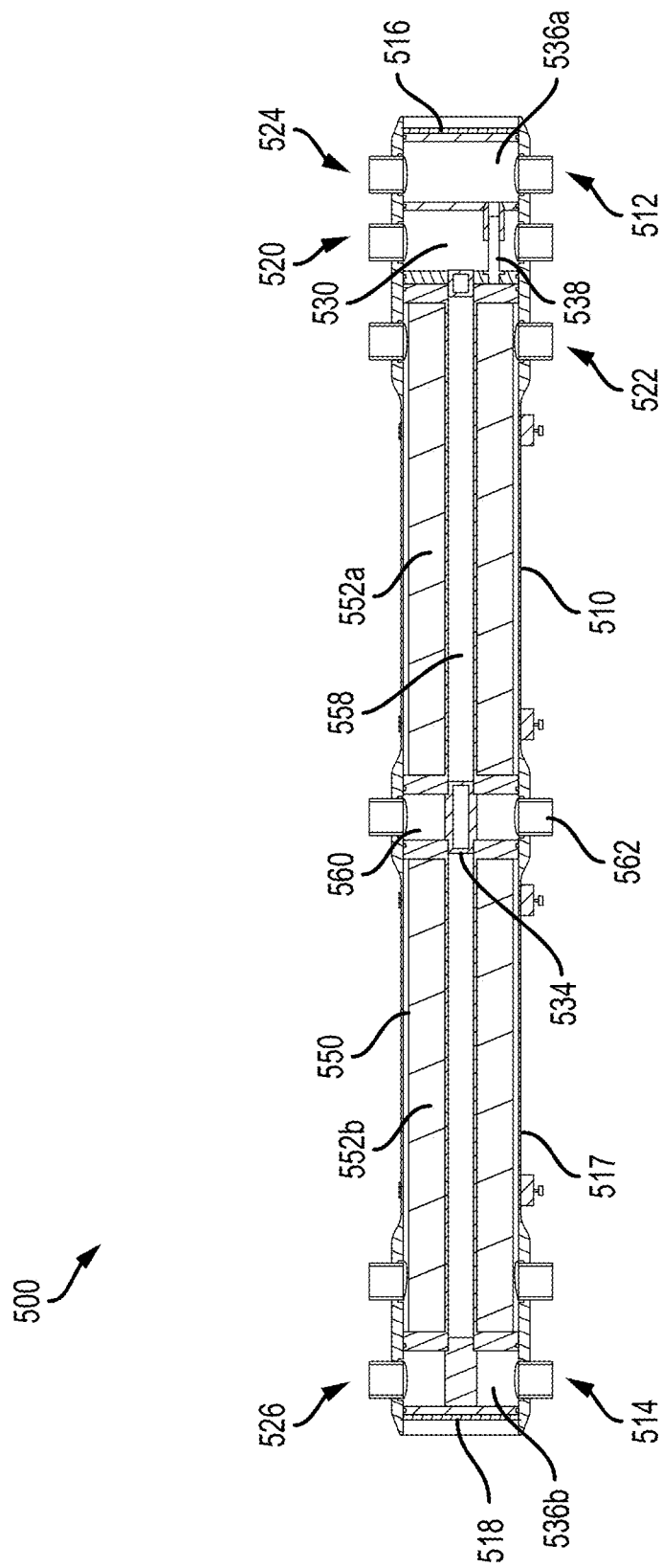
FIG. 11 depicts a cross-sectional view of an additional stackable forward osmosis membrane vessel having inlets and outlets solely through the side wall in accordance with yet another aspect of the disclosure.
Figure 12:
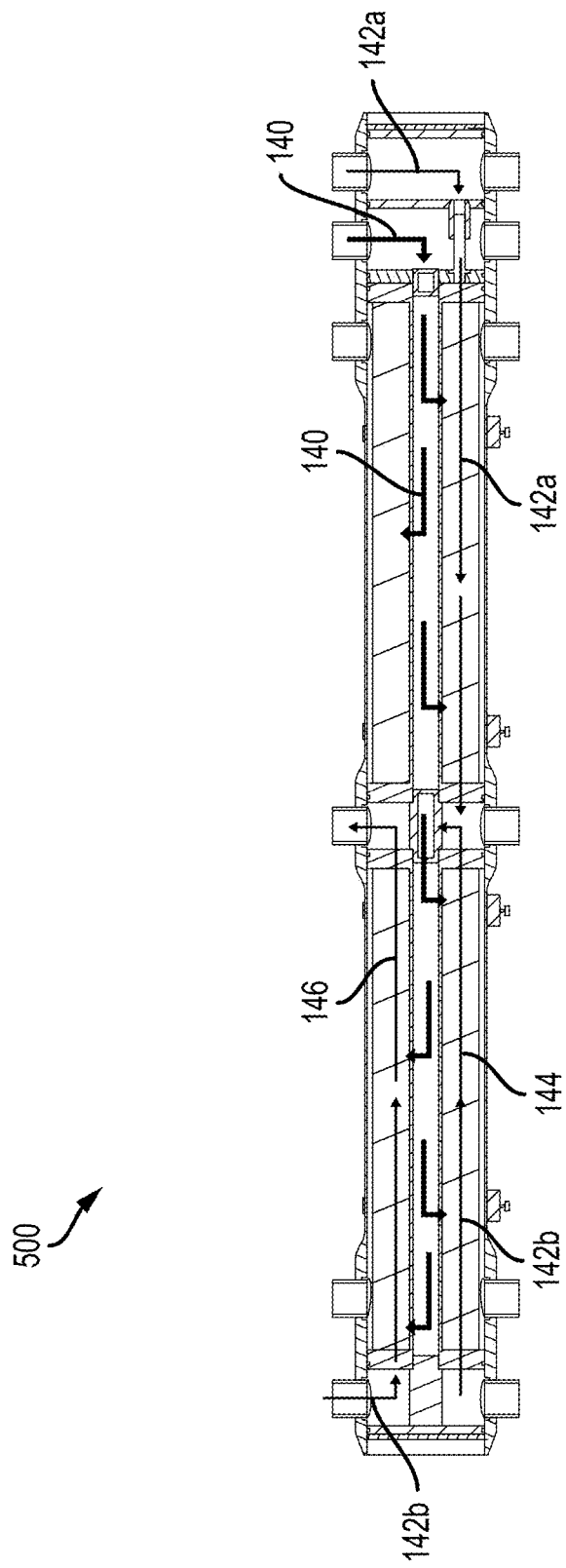
FIG. 12 depicts the cross-sectional view of the forward osmosis membrane vessel of FIG. 11 with arrows to indicate an exemplary flow path of the streams therein.

FIGS. 11 and 12 depict yet a further non-limiting, exemplary embodiment of a forward osmosis membrane vessel 500 in accordance with an aspect of the disclosure. Forward osmosis membrane vessel 500 operates similar to forward osmosis membrane vessels 100 and 300 and includes similar features and/or elements, which may be omitted for brevity from the description below. It should be understood that although similar features and/or elements may be employed, various aspects of forward osmosis membrane vessel 500, e.g., size, shape, material, etc., may be different than those described with respect to forward osmosis membrane vessels 100 and/or 300.

As a brief overview, forward osmosis membrane vessel 500 includes a body 510 defining a cavity 550 and at least two semipermeable membranes 552 disposed within cavity 550. Unlike forward osmosis membrane vessels 100 and 300, forward osmosis membrane vessel 500 includes a first feed stream inlet 524 and a second feed stream inlet 526 that extend through side wall 517 of body 510. Additionally, forward osmosis membrane vessel 500 may have all inlets and outlets for receiving a stream extending through side wall 517 of body 510. For instance, forward osmosis membrane vessel 500 may be configured to not have any inlets or outlet extending through base end 516 or 518.

Body 510 has a proximal end portion 512 and a distal end portion 514 spaced from proximal end portion 512. Body 510 may form a cylindrical shape having a first base end 516, a second base end 518, and a side wall 517 extending between first base end 516 and second base end 518. Body 510 is configured to include a plurality of inlets and outlets, which may be formed by one or more apertures. Body 510 defines at least a strong draw solution inlet 520, a diluted draw solution outlet 522, a first feed stream inlet 524, a second feed stream inlet 526, and a brine stream outlet 562 each be formed by a separate aperture extending from body 510. As illustrated by the embodiment shown in FIG. 11, strong draw solution inlet 520, diluted draw solution outlet 522, and brine stream outlet 562, first feed stream inlet 524, and second feed stream inlet 526 extend through side wall 517.

Forward osmosis membrane vessel 500 includes at least two feed stream chambers 536a and 536b. As depicted by FIG. 12, feed stream 142 may enter forward osmosis membrane vessel 500 through first feed stream inlet 524 located at proximal end portion 512 and second feed stream inlet 526 located at distal end portion 514. Feed streams 142a and 142b flowing through first and second feed stream inlets 524 and 526, respectively, may flow into feed stream chambers 536a and 536b, respectively. From feed stream chambers 536a and 536b, feed stream 142a and 142b flow to semipermeable membranes 552a and 552b, respectively. Feed stream 142a flowing through first feed stream inlet 524 flows through a feed stream manifold 538 that extends through draw solution chamber 530, such that feed stream 142a flows into first semipermeable membrane 552a without mixing with strong draw solution stream 140 within strong draw solution chamber 530. Strong draw solution stream 140 may enter forward osmosis membrane vessel 500 by way of strong draw solution inlet 520 and flow into strong draw solution chamber 530 and subsequently to passageway 558 extending through semipermeable membranes 552. Central core manifold 534 is disposed within brine chamber 560 to transfer strong draw solution stream 140 flowing through passageway 558a of first semipermeable membrane 552a to second passageway 558b of second semipermeable membrane 552b.

Figure 13:
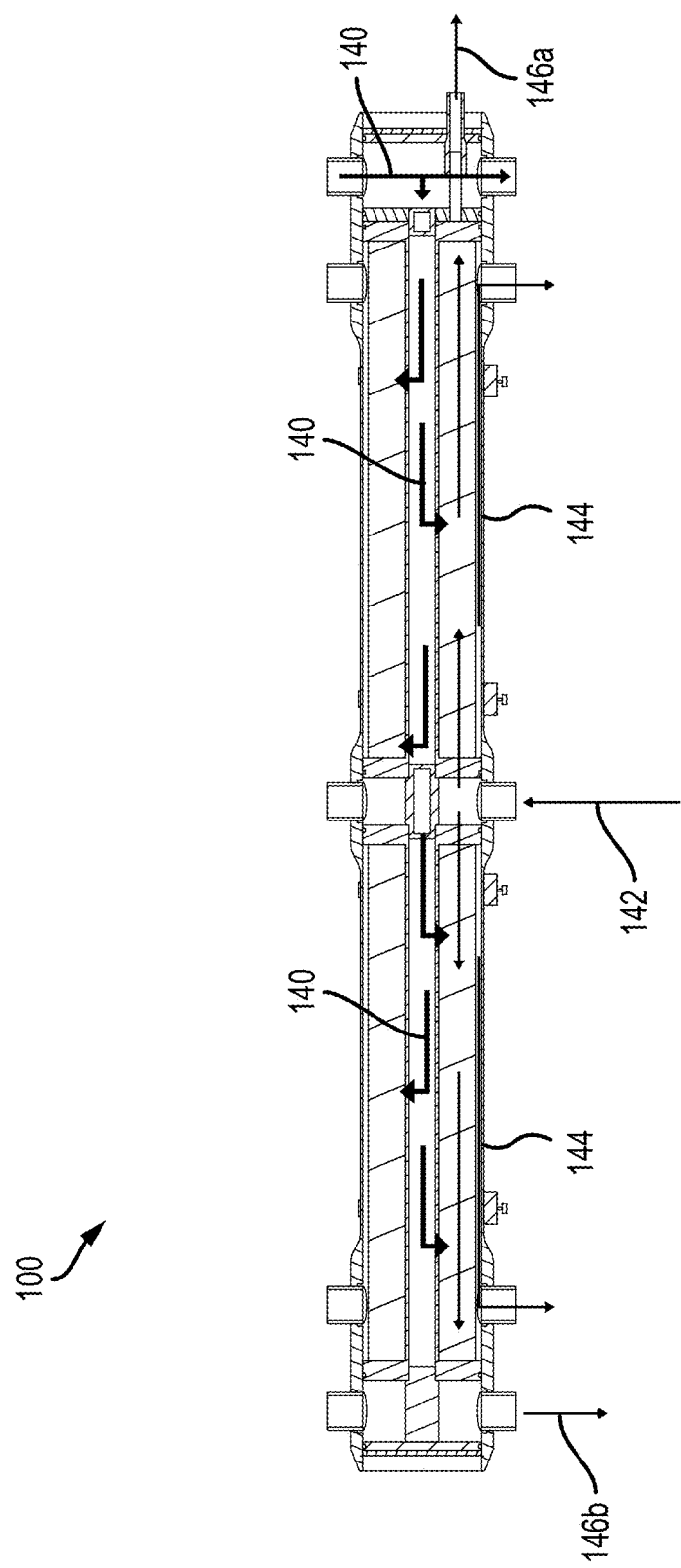
FIG. 13 depicts a cross-sectional view of the forward osmosis membrane vessel of FIG. 1 with arrows to indicate another exemplary flow path of the streams therein.
Figure 14:
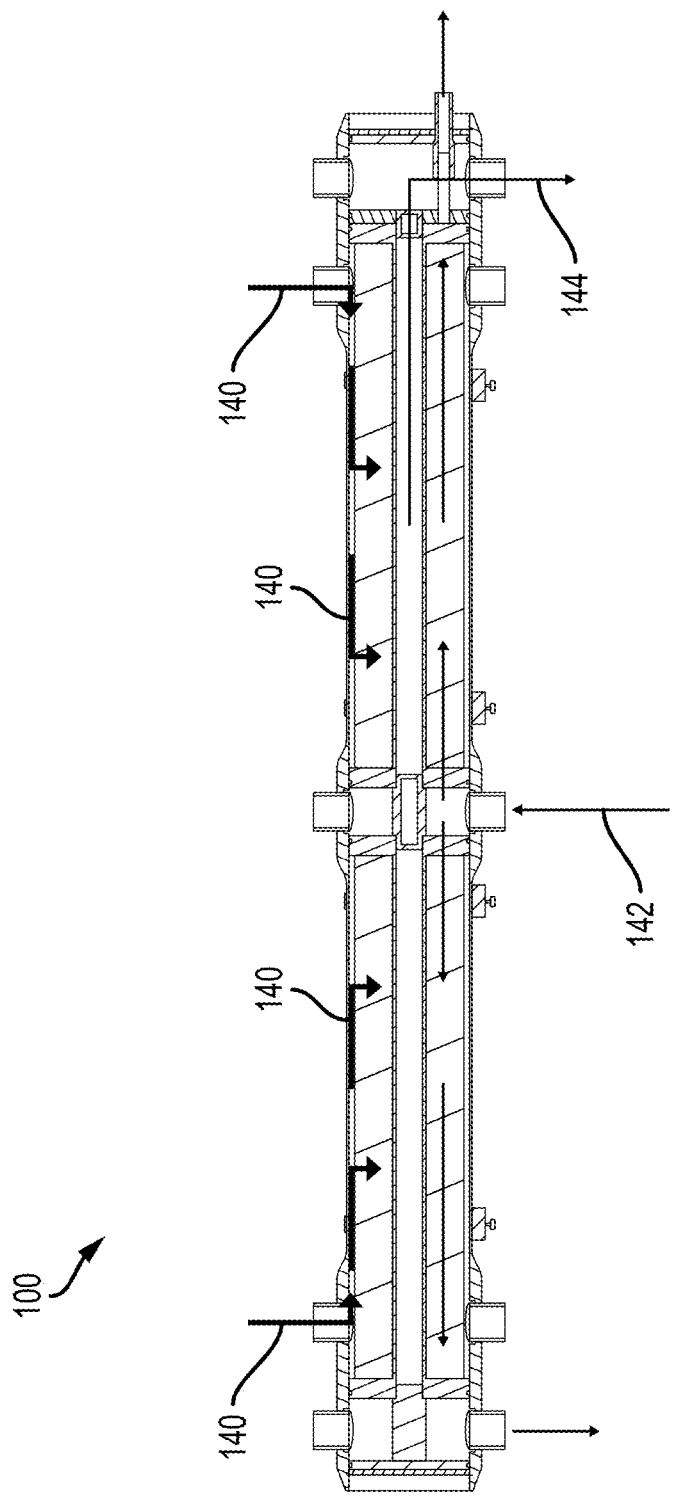
FIG. 14 depicts a cross-sectional view of the forward osmosis membrane vessel of FIG. 1 with arrows to indicate a further exemplary flow path of the streams therein.

FIGS. 13 and 14 depict a cross-sectional view of forward osmosis membrane vessel 100 of FIG. 1 with arrows to indicate exemplary flow paths of streams therein. As depicted by FIGS. 13 and 14, forward osmosis membrane vessel 100 may be operated with stream flow paths that are different from those illustrated in FIG. 2. For consistency, the elements of forward osmosis membrane vessel 100 have been labeled with the same reference numerals, although the stream flow paths of one or more of the strong draw solution stream 140, feed stream 142, diluted draw solution stream 144, and the brine stream 146 are different from those depicted in FIG. 2.

Pursuant to the stream flow path depicted in FIG. 13, feed stream 142 may enter forward osmosis membrane vessel 100 through brine outlet 162 and flow to brine chamber 160. From brine chamber 160, feed stream 142 may flow into first and second semipermeable membranes 152*a* and 152*b*. Brine streams 144*a* and 144*b*, produced respectively from first semipermeable membrane 152*a* and second semipermeable membrane 152*b*, may flow out of forward osmosis membrane vessel 100 through first feed inlet 124 and second feed inlet 126. As shown in FIG. 13, brine stream 146*b* collects in feed chamber 136 prior to flowing out of forward osmosis membrane vessel 100 through second feed inlet 126.

Pursuant to the stream flow path depicted in FIG. 14, strong draw solution stream 140 enters forward osmosis membrane vessel 100 through diluted draw solution inlets 123*a* and 123*b* and flows into the space defined between semipermeable membranes 152 and the inner surface defining cavity 150. Strong draw solution 140 subsequently flows through semipermeable membranes 152 in a radial direction inward toward passageway 158. As strong draw solution 140 flows through semipermeable membranes 152, diluted draw solution stream 144 is produced and collected in passageway 158 defined by the inner surface 156 of semipermeable membranes 152. Diluted draw solution stream 144 flows to and/or collects in strong draw solution chamber 130 prior to flowing out of forward osmosis membrane vessel 100 through strong draw solution outlet 132. Feed stream 142 and brine stream 146 may have a flow path through forward osmosis membrane vessel 100 similar to that depicted in FIG. 13.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A forward osmosis membrane vessel configured for stacking comprising:
    a body having a proximal end portion and a distal end portion spaced from the proximal end portion, the body defining a cavity therein and delineating a strong draw solution inlet, a strong draw solution outlet, a diluted draw solution inlet, a diluted draw solution outlet, a first feed stream inlet, a second feed stream inlet, a brine inlet, and a brine outlet;
    a strong draw solution chamber disposed within the cavity at one of the proximal end portion or the distal end portion, the strong draw solution chamber being in fluid communication with the strong draw solution inlet for receiving a strong draw solution stream;
    a first and a second semipermeable membrane each disposed within the cavity of the body and configured for forward osmosis filtration; and
    a brine chamber in fluid communication with the first semipermeable membrane for receiving a first brine stream and in fluid communication with the second semipermeable membrane for receiving a second brine stream,
    wherein the forward osmosis membrane vessel is configured to be stackable, such that in a stacked configuration the brine chamber and the strong draw solution chamber of the forward osmosis membrane vessel align with a brine chamber and a strong draw solution chamber of an adjacent second forward osmosis membrane vessel.

2. The forward osmosis membrane vessel stack comprising a plurality of forward osmosis membrane vessels of claim 1, wherein the plurality of forward osmosis membrane vessels includes at least a first forward osmosis membrane vessel in the stacked configuration with an adjacent second forward osmosis membrane vessel, wherein the brine chamber and the strong draw solution chamber of the first forward osmosis membrane vessel aligns with the brine chamber and the strong draw solution chamber of the adjacent second forward osmosis membrane vessel.

3. The forward osmosis membrane vessel stack of claim 2, wherein the brine outlet of the first forward osmosis membrane vessel is in fluid communication with the brine inlet of the adjacent second forward osmosis membrane vessel.

4. The forward osmosis membrane vessel stack of claim 3, wherein the brine outlet of the first forward osmosis membrane vessel is connected to the brine inlet of the adjacent second forward osmosis membrane vessel.

5. The forward osmosis membrane vessel stack of claim 2, wherein the strong draw solution outlet of the first forward osmosis membrane vessel is in fluid communication with the strong draw solution inlet of the adjacent second forward osmosis membrane vessel.

6. The forward osmosis membrane vessel stack of claim 5, wherein the strong draw solution outlet of the first forward osmosis membrane vessel is connected to the strong draw solution inlet of the adjacent second forward osmosis membrane vessel.

7. The forward osmosis membrane vessel stack of claim 2, wherein the diluted draw solution outlet of the first forward osmosis membrane vessel is in fluid communication with the diluted draw solution inlet of the adjacent second forward osmosis membrane vessel.

8. The forward osmosis membrane vessel stack of claim 7, wherein the diluted draw solution outlet of the first forward osmosis membrane vessel is connected to the diluted draw solution inlet of the adjacent second forward osmosis membrane vessel.

9. A forward osmosis membrane vessel comprising:
    a body having a proximal end portion and a distal end portion spaced from the proximal end portion, the body defining a cavity therein and delineating a strong draw solution inlet, a strong draw solution outlet, a diluted draw solution inlet, a diluted draw solution outlet, a first feed stream inlet, a second feed stream inlet, a brine inlet, and a brine outlet;
    a strong draw solution chamber disposed within the cavity at one of the proximal end portion or the distal end portion, the strong draw solution chamber being in fluid communication with the strong draw solution inlet for receiving a strong draw solution stream;
    a first and a second semipermeable membrane each disposed within the cavity of the body, the first and the second semipermeable membranes each comprising a feed side for receiving a feed stream comprising a feed solute, and a draw side for receiving the strong draw solution stream comprising a draw solute, wherein the first and second semipermeable membranes are configured to produce a diluted draw solution stream and the first semipermeable membrane is configured to produce a first brine stream and the second semipermeable membrane is configured to produce a second brine stream; and a brine chamber disposed at least partially between the first semipermeable membrane and the second semipermeable membrane, the brine chamber in fluid communication with the first semipermeable membrane for receiving the first brine stream and in fluid communication with the second semipermeable membrane for receiving the second brine stream, wherein the forward osmosis membrane vessel is configured to be stackable, such that in a stacked configuration the brine chamber and the strong draw solution chamber of the forward osmosis membrane vessel align with a brine chamber and a strong draw solution chamber of an adjacent second forward osmosis membrane vessel.

10. The forward osmosis membrane vessel of claim 9, wherein the first feed stream inlet is delineated by the body at one of the proximal end portion or the distal end portion;

wherein the second feed stream inlet is delineated by the body at the other one of the proximal end portion or the distal end portion; and wherein the body has a first base end, a second base end, and a side wall extending between the first base end and the second base end.

11. The forward osmosis membrane vessel of claim 10, wherein the body has a cylindrical configuration with a circumferential side wall extending between the first base end and the second base end.

12. The forward osmosis membrane vessel of claim 10, wherein at least the strong draw solution inlet, the diluted draw solution outlet, the first feed stream inlet, and the brine outlet are delineated by the side wall of the body; and wherein the side wall of the body has a plurality of apertures forming the strong draw solution inlet, the diluted draw solution outlet, the first feed stream inlet, and the brine outlet.

13. The forward osmosis membrane vessel of claim 10, wherein all inlets and outlets for receiving a flow are defined by the side wall of the body.

14. The forward osmosis membrane vessel of claim 9, wherein the vessel has a brine stream outlet.

15. The forward osmosis membrane vessel of claim 9, wherein the first semipermeable membrane and the second semipermeable membrane are each configured to be cylindrical with a passageway extending therethrough; and wherein the passageway of the first semipermeable membrane coaxially aligns with the passageway of the second semipermeable membrane.

16. The forward osmosis membrane vessel of claim 9, further comprising a central core manifold that extends through the brine chamber;

wherein the central core manifold is configured to transfer strong draw solution flowing through a passageway of the first semipermeable membrane to the passageway of the second semipermeable membrane.

17. A forward osmosis membrane vessel comprising:

a body having a proximal end portion and a distal end portion spaced from the proximal end portion, the body delineating a strong draw solution inlet, a strong draw solution outlet, a diluted draw solution inlet, a diluted draw solution outlet, a first feed stream inlet, a second feed stream inlet, a brine inlet, and a brine outlet, the body having an inner surface defining a cavity therein, a strong draw solution chamber disposed within the cavity at one of the proximal end portion or the distal end portion, the strong draw solution chamber being in fluid communication with the strong draw solution inlet for receiving a strong draw solution stream;

a plurality of semipermeable membranes each disposed within the cavity of the body, the plurality of semipermeable membranes each having a first end, a second end spaced from the first end, and an inner surface delineating a passageway extending from the first end to the second end, each of the plurality of semipermeable membranes having a draw side along the inner surface of semipermeable membrane for receiving the strong draw solution stream comprising a draw solute and a feed side at the first end for receiving a feed stream comprising a feed solute, wherein the plurality of semipermeable membranes are configured to permit water and the draw solute to transfer therethrough, such that the draw solute flows in a cross-flow direction with respect to the feed stream and each of the plurality of semipermeable membranes produces a brine stream, wherein the plurality of semipermeable membranes are configured to operate in parallel; and a brine chamber for receiving the brine stream produced by each of the plurality of semipermeable membranes, the brine chamber in fluid communication with the brine outlet, wherein the forward osmosis membrane vessel is configured to be stackable, such that in a stacked configuration the brine chamber and the strong draw solution chamber of the forward osmosis membrane vessel align with a brine chamber and a strong draw solution chamber of an adjacent second forward osmosis membrane vessel.

18. The forward osmosis membrane vessel of claim 17, wherein the plurality of semipermeable membranes includes two semipermeable membranes configured to operate in parallel.

19. The forward osmosis membrane vessel of claim 17, wherein the plurality of semipermeable membranes includes at least three semipermeable membranes configured to operate in parallel.

20. The forward osmosis membrane vessel of claim 17, wherein the draw solute flows through the semipermeable membrane in a radial direction, wherein the feed stream flows in an axial direction;

wherein a space extends between the inner surface of the body and the plurality of semipermeable membranes, the space adapted for receiving the diluted draw solution; and wherein the space extending between the inner surface of the body and the plurality of semipermeable membranes is in fluid communication with the diluted draw solution outlet.

* * * * *